United States Patent [19]

Itoh et al.

[11] Patent Number: 4,701,283

[45] Date of Patent: Oct. 20, 1987

[54] PROCESS FOR PREPARING AMIDOALKANESULFONIC ACIDS

[75] Inventors: Hiroshi Itoh; Atsuhiko Nitta, both of Yokohama; Hideo Kamio, Odawara, all of Japan

[73] Assignee: Mitsui Toatsu Chemicals Incorporated, Tokyo, Japan

[21] Appl. No.: 793,738

[22] PCT Filed: Jun. 22, 1983

[86] PCT No.: PCT/JP83/00201

§ 371 Date: Feb. 16, 1984

§ 102(e) Date: Feb. 16, 1984

[87] PCT Pub. No.: WO84/00165

PCT Pub. Date: Jan. 19, 1984

[30] Foreign Application Priority Data

Jun. 24, 1982 [JP]  Japan ................................ 57-107538

[51] Int. Cl.$^4$ .......................................... C07C 143/155
[52] U.S. Cl. ............................ 260/507 R; 260/513 N
[58] Field of Search ........................ 260/513 N, 507 R

[56] References Cited

U.S. PATENT DOCUMENTS 3,547,899 12/1970 Arlt ...................................... 526/287
4,219,498 8/1980 Doi ................................. 260/513 N

OTHER PUBLICATIONS

Organic Reactions, 17, 216-217, and 226.
Kharash et al, J.A.C.S., 61, 3092-3098 (1939).
March, J., Advanced Org. Chem., McGraw Hill (N.Y.), 1968, p. 715.

*Primary Examiner*—Christopher Henderson
*Attorney, Agent, or Firm*—Fisher, Christen & Sabol

[57] ABSTRACT

Disclosed is a novel process for preparing amidoalkanesulfonic acids of the general formula

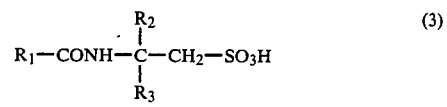

or derivatives thereof by reacting a nitrile compound (1) with a β-hydroxyalkanesulfonic acid or a derivative thereof (2) in concentrated sulfuric acid.

Among the compounds of the general formula (3) and derivatives thereof, unsaturated amido- and phenyl-substituted alkanesulfonic acids and derivatives thereof (in particular, 2-acrylamido-2-phenylpropane-sulfonic acid and derivatives thereof) represented by the general formula

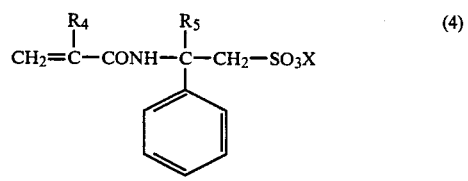

can be copolymerized with other monomers and the like to provide useful materials such as copolymer-coated solid materials, copolymer emulsions, pigment dispersants and the like.

7 Claims, No Drawings

PROCESS FOR PREPARING AMIDOALKANESULFONIC ACIDS

This application is a continuation of application Ser. No. 06/582574, filed 02/16/84 now abandoned.

DESCRIPTION

1. Technical Field

This invention relates to a process for preparing amidoalkanesulfonic acids and derivatives, such as salts, thereof (hereinafter referred to briefly as amidoalkanesulfonic acid derivatives), as well as copolymer-coated solid materials, copolymer emulsions and pigment dispersants in which the copolymer is obtained by copolymerizing such an amidoalkanesulfonic acid derivative (in particular, 2-acrylamido-2-phenylpropanesulfonic acid or its salt) with another monomer or the like.

2. Background Art

Amidoalkanesulfonic acid derivatives are useful as lime soap dispersants. Among others, unsaturated amidoalkanesulfonic acid derivatives are known to have wide applications as raw materials for the manufacture of water-soluble polymers (for example, flocculants, dispersants, adhesives and thickeners) and as raw materials for the manufacture of ion exchangers such as ion exchange resins.

Conventionally, there are two well-known methods for preparing amidoalkanesulfonic acid derivatives. One of them involves the reaction of an aminoalkanesulfonic acid or its derivative with acrylic acid chloride and the other involves the reaction of a nitrile, an olefin and concentrated sulfuric acid including fuming sulfuric acid.

However, the former method requires expensive raw materials and, therefore, is not suitable for industrial practice. On the other hand, the latter method is currently used in the industrial production of 2-acrylamido-2-methylpropanesulfonic acid (hereinafter abbreviated as AMPS). However, although this method is suitable for the preparation of AMPS, it is not yet perfected as a technique fully applicable to the preparation of other amidoalkanesulfonic acid derivatives. One reason for this is that the olefin used in the latter method generally has a very high degree of cationic polymerizability. Thus, the method is practicable in the case of isobutene, but other olefins used as raw materials tend to undergo side reactions (cationic polymerization and the like) in concentrated sulfuric acid and fail to produce satisfactory results.

DISCLOSURE OF THE INVENTION

It is an object of the present invention to provide a novel process for preparing amidoalkanesulfonic acid derivatives which permits not only AMPS but also other amidoalkanesulfonic acid derivatives to be prepared with ease.

It is another object of the present invention to provide polymer-coated solid materials, polymer emulsions and pigment dispersants useful in industry, which are obtained by using unsaturated amido- and phenyl-substituted alkanesulfonic acids, preferably 2-acrylamido-2-phenylpropanesulfonic acid, among the amidoalkanesulfonic acid derivatives prepared by the aforesaid process or the like and copolymerizing them with monomers having a radical polymerizable unsaturated bond or α,β-monoethylenically unsaturated carboxylic acids.

The above-described first object of the present invention can be accomplished by reacting a nitrile compound of the general formula

$$R_1-C\equiv N \quad (1)$$

where $R_1$ is an alkyl, alkenyl, phenylalkyl or aryl group, with a β-hydroxyalkanesulfonic acid of the general formula

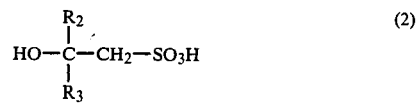

$$HO-\underset{\underset{R_3}{|}}{\overset{\overset{R_2}{|}}{C}}-CH_2-SO_3H \quad (2)$$

where $R_2$ and $R_3$ are hydrogen, lower alkyl groups or phenyl groups, or an alkali metal, alkaline earth metal or ammonium salt thereof in concentrated sulfuric acid to form an amidoalkanesulfonic acid of the general formula

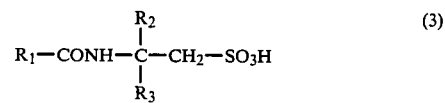

$$R_1-CONH-\underset{\underset{R_3}{|}}{\overset{\overset{R_2}{|}}{C}}-CH_2-SO_3H \quad (3)$$

where $R_1$, $R_2$ and $R_3$ have the same meanings as described above, or a derivative thereof.

The above-described second object can be accomplished by carrying out the respective methods which will be described later.

BEST MODE FOR CARRYING OUT THE INVENTION

To begin with, there will be described the process for preparing amidoalkanesulfonic acid derivatives which process constitutes the first object of the present invention.

Specifically, the nitrile compounds which can be used in the process of the present invention include saturated hydrocarbon nitriles, unsaturated hydrocarbon nitriles and aromatic hydrocarbon nitriles, all having 1 to 12 carbon atoms. Examples thereof are acetonitrile, propionitrile, butyronitrile, octanitrile, decanitrile, dodecanitrile, acrylonitrile, methacrylonitrile, crotonitrile, benzonitrile, phenylacetonitrile, tolunitrile and the like. Among others, it is preferable to use unsaturated hydrocarbon nitriles such as acrylonitrile.

On the other hand, β-hydroxyalkanesulfonic acids of formula (2) and their derivatives are novel compounds as disclosed in Japanese Patent Application Nos. 102078/'82 and 106711/'82 which have previously been filed in the name of the present inventors. Typical of the β-hydroxyalkanesulfonic acid derivatives are alkali metal, alkaline earth metal and ammonium salts of the acids. The alkali metal salts include sodium, potassium, lithium and like salts and the alkaline earth salts include magnesium, calcium, barium and like salts. The lower alkyl groups represented by $R_2$ and $R_3$ refer to methyl, ethyl, propyl, butyl and like groups. Both $R_2$ and $R_3$ cannot be hydrogen atoms, and at least one of $R_2$ and $R_3$ is a lower alkyl or phenyl group.

Specifically, these compounds include 2-phenyl-2-hydroxypropanesulfonic acid, 2-methyl-2-hydroxypropanesulfonic acid, 2-phenyl-2-hydroxyethanesulfonic acid and 2-hydroxypropanesulfonic acid, as well as alkali metal, alkaline earth metal and ammonium salts of the foregoing compounds.

Generally, these compounds can be readily prepared by reacting the corresponding olefin with hydrogensulfite ion in the presence of oxygen. During this reaction, a β-sulfatoalkanesulfonic acid salt may be formed as a by-product. However, instead of isolating such a by-product, the resulting product can be directly used without any difficulty to produce amidoalkanesulfonic acid derivatives in accordance with the present invention.

The concentrated sulfuric acid used in the process of the present invention can have various concentrations varying from 30% concentrated sulfuric acid to 30% fuming sulfuric acid (the term "30% fuming sulfuric acid" refers to a mixture of 70% $H_2SO_4$ and 30% sulfur trioxide, and the same abbreviation shall apply hereinafter).

The quantitative relationship between the starting materials used in the process of the present invention is such that the nitrile compound is used in an amount of 1 to 40 moles, preferably 2 to 30 moles, and concentrated sulfuric acid is used in an amount of 1 to 20 moles, preferably 1 to 15 moles, per mole of the hydroxyalkanesulfonic acid or its salt. As described above, it is preferable to add the nitrile compound in excess so that it may also function as a diluent and solvent for the reaction mixture.

The reaction temperature may range from $-30°$ to $120°$ C. and preferably from $-25°$ C. to $100°$ C. Usually, the reaction temperature need not be kept constant. Thus, it is common practice to use a low temperature at the initial stage of the reaction and then raise the temperature gradually. Although the reaction time depends on the reaction temperature, it usually ranges from 30 minutes to 20 hours. The optimum time can be determined by following the reaction.

In order to follow the reaction, for example, the rate of disappearance of the nitrile compound or the rate of formation of the desired product may be traced by gas chromatography or high-speed liquid chromatography.

The amidoalkanesulfonic acid derivatives prepared by the process of the present invention include a large number of compounds. If such compounds are represented by unsaturated amidoalkanesulfonic acids, specific examples thereof are 2-acrylamido-2-phenylpropanesulfonic acid, 2-acrylamido-2-methylpropanesulfonic acid, 2-acrylamido-2-phenylethanesulfonic acid, 2-acrylamidopropanesulfonic acid, 2-methacrylamido-2-phenylpropanesulfonic acid, 2-methacrylamido-2-methylpropanesulfonic acid, 2-crotonamido-2-phenylpropanesulfonic acid, 2-crotonamido-2-methylpropanesulfonic acid and the like.

In carrying out the process of the present invention, the nitrile compound, the hydroxylalkanesulfonic acid or its salt, and concentrated sulfuric acid may be added in any desired order. A convenient method for mixing these three reactants uniformly is to suspend the hydroxyalkanesulfonic acid salt in the nitrile and then initiate the reaction by adding concentrated sulfuric acid thereto. In order that the reaction may proceed smoothly, it is preferable to raise the reaction temperature after the addition of concentrated sulfuric acid. Where concentrated sulfuric acid having a concentration of not less than 90% is used for the reaction, the sulfate of the amidoalkanesulfonic acid salt usually comes to deposit as a white material, though it depends on the reaction conditions. Thus, after the reaction is carried out for a predetermined period of time, the sulfate of the amidoalkanesulfonic acid salt can be precipitated by adding a nitrile compound such as acrylonitrile. The nitrile compound used for this purpose need not necessarily be the same as the starting nitrile compound. However, it is preferable to use the same nitrile compound in order to simplify the procedure.

The separated sulfate is dissolved in water and neutralized with an alkaline substance, and the precipitate so formed is removed by filtration. Thus, the desired amidoalkanesulfonic acid salt can be obtained in the filtrate. If it is desired to separate the amidoalkanesulfonic acid salt as an alkali metal salt, the following procedure may be used: where the starting hydroxyalkanesulfonic acid salt is an alkali metal salt, an alkaline earth metal oxide, hydroxide or carbonate is used for the neutralization. Then, the formed sulfate moiety of the amidoalkanesulfonic acid salt can be separated from the aqueous solution by forming the alkaline earth metal sulfate with added alkaline substance, so that the desired alkali metal salt of the amidoalkanesulfonic acid can be obtained in the aqueous solution.

On the other hand, where an alkaline earth metal salt of the hydroxyalkanesulfonic acid is used, an alkali metal oxide, hydroxide or carbonate is used for the neutralization. Then, the sulfate can be separated from the aqueous solution, so that the desired alkali metal salt of the amidoalkanesulfonic acid can be obtained in the aqueous solution.

If it is desired to separate the desired amidoalkanesulfonic acid salt as an alkaline earth metal salt, it is preferable to use an alkaline earth metal salt of the hydroxyalkanesulfonic acid and, in addition, an alkaline earth metal oxide, hydroxide or carbonate for the neutralization. In this manner, the desired amidoalkanesulfonic acid salt can be obtained in the form of an aqueous solution. This aqueous solution may be used as such, or water may be distilled off therefrom to obtain a solid product. On the other hand, the filtrate may be reused by recycling it to the reaction system.

If it is desired to minimize the contamination of the product with inorganic materials (such as inorganic sulfates and the like) and thereby obtain a product of high purity, the sulfate of the amidoalkanesulfonic acid salt may be neutralized in a polar organic solvent to obtain a product of high purity. Polar organic solvents useful for this purpose are organic solvents miscible with water and include water-containing solvents. Specific examples thereof are methanol, ethanol, propanol, butanol, ethylene glycol and its derivatives, dimethylformamide, dimethylacetamide, dimethyl sulfoxide, sulfolane, pyridine, acetone, acetonitrile and the like. Among others, alcohols such as methanol, ethanol and the like are preferably used. Although the permissible water content depends on the amount of inorganic salts allowed in the product, it is generally not greater than 50% by volume and preferably not greater than 30% by volume. On the other hand, the basic substance used for the neutralization may be any compound that can neutralize sulfuric acid. Useful basic substances include, for example, alkali metal or alkaline earth metal hydroxides, carbonates and alkoxides, as well as organic amines and the like. Among others, alkali metal hydroxides such as sodium hydroxide, potassium hydroxide, etc.; alkali metal carbonates such as sodium carbonate, potassium carbonate, etc.; alkali metal alkoxides such as sodium methoxide, etc.; and organic tertiary amines such as trimethylamine, triethylamine, etc. are preferred.

Specifically, the neutralization can be carried out, for example, by dissolving or suspending the sulfate of the amidoalkanesulfonic acid salt in a polar organic solvent and adding thereto a predetermined amount of a basic substance as such or as a solution or suspension in water or a polar organic solvent. After completion of the neutralization, the solution or suspension is filtered to remove the resulting inorganic sulfate and the solvent is distilled off from the filtrate, so that the desired amidoalkanesulfonic acid derivative can be separated as a solid material.

On the other hand, where concentrated sulfuric acid has a concentration of less than 90%, the sulfate may either dissolve in the reaction mixture or hydrolyze to form a precipitate of gypsum, depending on the reaction conditions. The manner in which the reaction takes place cannot be described comprehensively. In any case, an oxide, hydroxide, carbonate or the like of alkaline earth metal such as calcium or barium may be added to neutralize the remaining sulfuric acid and thereby remove it as a sulfate, so that the desired compound can be obtained in the aqueous solution.

As described above, the process of the present invention uses a hydroxyalkanesulfonic acid or its salt as one of the starting materials. Accordingly, in contrast to the case in which an olefin is used, amidoalkanesulfonic acid derivatives of high purity can be prepared in good yield.

Now, there will be described useful products obtained by using an amidoalkanesulfonic acid derivative as a raw material which products constitute the second object of the present invention.

Among the amidoalkanesulfonic acid derivatives prepared by the above-described process or the like, unsaturated amido- and phenyl-substituted alkanesulfonic acid derivatives of the general formula

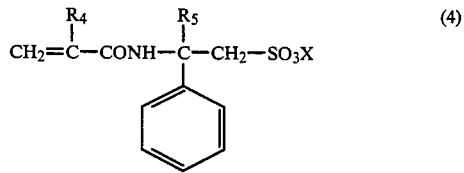

$$CH_2=C(R_4)-CONH-C(R_5)(C_6H_5)-CH_2-SO_3X \quad (4)$$

where $R_4$ and $R_5$ are hydrogen or lower alkyl groups, and X is a hydrogen, alkali metal, alkaline earth metal or ammonium ion, such as 2-acrylamide-2-phenylpropanesulfonic acid, 2-acrylamido-2-phenylethanesulfonic acid, 2-methacrylamido-2-phenylpropanesulfonic acid and their derivatives (for example, salts or the like) and, in particular, 2-acrylamido-2-phenylpropanesulfonic acid and its derivatives can be copolymerized with copolymerizable monomers to provide useful materials as described in the following. These materials will hereinafter be described in detail one after another.

First of all, there is provided a copolymer-coated solid material obtained by copolymerizing a monomer having a radical polymerizable unsaturated bond with an unsaturated amido- and phenyl-substituted alkanesulfonic acid derivative as described above, in a liquid medium having a solid material suspended therein.

In recent years, methods for coating a solid material by bringing it into contact with a monomer having a radical polymerizable unsaturated bond and a polymerization initiator in the presence of an vinyl-containing organic sulfonic acid or its salt have been disclosed in Japanese Patent Publication No. 8548/'79 and Japanese Patent Laid-Open No. 115412/'82. The methods disclosed therein are not fully practicable ones because the type of the monomer actually used is essentially restricted to methyl methacrylate and these methods are not applicable to a wide variety of solid materials.

The unsaturated amido- and phenyl-substituted alkanesulfonic acid derivatives represented by the above general formula (4) are compounds exhibiting unique polymerization properties characterized by poor homopolymerizability and high copolymerizability. When used for the above-described purpose, the unsaturated amido- and phenyl-substituted alkanesulfonic acid derivatives such as 2-acrylamido-2-phenylpropanesulfonic acid (hereinafter abbreviated as APPS) derivatives may be in the form of free acids or salts. The monomer having a radical polymerizable unsaturated bond, which is used in combination therewith, can be any monomer that gives a copolymer having insolubility in water, and it is preferable to copolymerize at least one hydrophobic monomer. Useful hydrophobic monomers include, for example, styrene, vinyl acetate, vinyl chloride, acrylonitrile, ethyl acrylate, butyl acrylate, glycidyl acrylate, MMA, butyl methacrylate, glycidyl methacrylate, N-propylacrylamide, n-butylacrylamide, n-octylacrylamide, N-ethylmethacrylamide, N-butylacrylamide, N,N-diglycidylacrylamide, N-acryloylpyrrolidine, N-acryloylpiperidine, N-methacryloylpyrrolidine, ethylene, propylene, divinylbenzene, ethylene glycol dimethacrylate, divinyl ether, butadiene, chloroprene and the like. Typical examples of hydrophilic monomers which are copolymerizable with these hydrophobic monomers include hydroxyethyl methacrylate, N-vinylpyrrolidone, acrylamide, N,N-dimethylacrylamide, N-ethylacrylamide, methacrylamide, acrylic acid and its salts, methacrylic acid and its salts, and the like.

On the other hand, the solid material to be coated can be any of inorganic and organic materials having various forms such as balls, powder, fibers, plates, flakes and the like. The inorganic solid materials include metals, oxides, sulfides, nitrides, carbides, silicides, borides, chlorides, phosphates, sulfates, sulfites, carbonates, silicates and hydroxides, as well as mixtures, double salts and intermolecular compounds of the foregoing. Specific examples thereof are iron powder, copper powder, aluminum powder, alumina, iron oxide red, ferrite, cadmium sulfide, carbon nitride, boron carbide, zirconium silicide, calcium boride, silver chloride, aluminum phosphate, gypsum, calcium sulfite, calcium carbonate, aluminum hydroxide, silica gel and the like. Moreover, inorganic pigments such as titanium white, zinc white, chrome yellow, cobalt blue, chrome green, white carbon, etc. and natural minerals such as perlite, asbestos, sand, mica powder, shirasu balloon, zeolite, talc, bentonite, clay, etc. can also be used. The organic solid materials include various plastics, organic pigments, organic fillers, natural high polymers and the like. Specific examples thereof include polyvinyl chloride, polyethylene, polypropylene, polyvinyl acetate, polyvinyl alcohol, polyacrylonitrile, polyester, polyamide and other plastics, phthalocyanine pigments, azo pigments, quinacridone pigments, perinone pigments, anthraquinone pigments, carbon black, urea resin filler and the like. Moreover, pulp, wood flour, starch, straw, cellulose, cotton, silk, wool and the like can also be used.

The amounts of various starting materials used in the preparation of the copolymer-coated solid material of the present invention are as follows: The unsaturated amido- and phenyl-substituted alkanesulfonic acid derivative is suitably used in an amount of 0.05 to 40% by weight, preferably 0.1 to 20% by weight, based on the weight of the aforesaid monomer. The monomer, in turn, is suitably used in an amount of 0.05 to 1,000% by weight, preferably 0.1 to 500% by weight, based on the weight of the aforesaid solid material. The reason why the amount of monomer used varies over such a wide range is that there are a variety of embodiments including the case in which the solid material is coated with a very thin layer of copolymer and the case in which it is desired to form plastic beads whose core consists of the solid material. The amount of unsaturated amido- and phenyl-substituted alkanesulfonic acid derivative used is preferably determined on the basis of the aforesaid monomer, as described above.

The polymerization initiator used for the polymerization can be any of water-soluble radical polymerization initiators such as persulfates and the like. It is also possible to use a redox polymerization initiator. Although the polymerization temperature varies according to the type of initiator used, it usually ranges from 0 to 100° C. and preferably from 10 to 90° C. The amount of polymerization initiator added may conform to the usual polymerization conditions. By way of example, it is suitably 0.01 to 5% by weight, preferably 0.05 to 2% by weight, based on the weight of the monomer.

The liquid medium in which the solid material is dispersed can be any liquid that permits the solid material to be dispersed therein. It is common practice to use water. Alcohols, ketones, and mixtures of these compounds and water can also be used. The liquid medium may be used in any desired amount that permits the solid material to be dispersed therein. Usually, the amount of liquid medium used equals 0.2 to 1,000 times, preferably 0.5 to 500 times, the volume of the solid material. In addition, surface active agents may also be used to improve the dispersibility of the solid material and the monomer. Various surface active agents including anionic, nonionic and cationic ones can be used for this purpose.

No particular limitation is placed on the order in which the unsaturated amido- and phenyl-substituted alkanesulfonic acid derivative, the monomer and the solid material are added, and these three components may be added in any desired order. However, it is common practice to dissolve the unsaturated amido- and phenyl-substituted alkanesulfonic acid derivative previously in the liquid medium and then add thereto the monomer and the solid material. After they are dispersed in the liquid medium, a polymerization initiator is added to initiate the polymerization. The time of addition of the polymerization initiator may be prior to the addition of the monomer. With regard to the atmosphere within the polymerization vessel, it is preferable to purge it with an inert gas such as nitrogen gas or the like, though the polymerization can be carried out under an atmosphere of an oxygen-containing gas such as air or the like. The progress of the reaction can be traced by observing changes in the appearance of the dispersed solid material or determining the amount of the remaining monomer by gas chromatography or the like. After the polymerization is carried out for a predetermined period of time, a polymer-coated solid material can be separated from the reaction mixture by filtration, centrifugation or other method.

On the other hand, the filtrate may be discharged or recycled.

Thus, according to the present invention, the types of monomer and solid material used in the preparation of the copolymer for coating solid materials can vary widely as compared with the prior art, and the composition and amount of the copolymer for coating solid materials can be controlled easily. Accordingly, the present invention provides novel and useful polymer-coated solid materials necessary for the development of new functional materials by combinations of different materials, the polymer-coated solid materials serving, for example, as a means for increasing the affinity of various inorganic fillers for organic substances to be blended therewith or as a means for coating a different polymer on polymer particles to form a molded product or emulsion which have never been obtained by conventional methods.

A second useful material obtained by copolymerizing an unsaturated amido- and phenyl-substituted alkanesulfonic acid derivative with another copolymerizable monomer is a polymer emulsion which is obtained by copolymerizing a monomer having a radical polymerizable unsaturated bond with an unsaturated amido- and phenyl-substituted alkanesulfonic acid derivative as described above, in an aqueous medium containing or not containing an emulsifying agent.

Conventionally, polymer emulsions such as styrene-butadiene copolymer latex, acrylate copolymer latex, vinyl acetate polymer emulsion and the like have been used as binders for fiber bonding (in the manufacture of nonwoven fabrics, synthetic leathers and the like), binders for coated paper, binders for water paints, concrete reinforcements and the like. Recently, in addition to their use as binders, a new application as a carrier of antibodies or enzymes (as exemplified by a polystyrene latex for diagnostic reagents) is being developed.

Generally, in applications involving direct use of such polymer emulsions, the chemical and mechanical stability of the emulsions poses a major problem. Accordingly, a number of methods aiming at the improvement of their stability have been proposed. However, the majority of them are concerned with improvements on the type, composition, amount and the like of the emulsifying agent used and do not offer any fundamental solution for the impairment of water resistance, film-forming properties and the like due to the addition of large amounts of emulsifying agent. In order to overcome these difficulties due to the presence of an emulsifying agent, a method using acrylic acid or AMPS is also known. However, this method is disadvantageous in that a water-soluble polymer is additionally formed in the aqueous phase, thus offering no satisfactory solution for the above-described problems.

If an unsaturated amido- and phenyl-substituted alkanesulfonic acid derivative (in particular, APPS or its salt) represented by the above general formula (4) is used, a highly stable polymer emulsion can be obtained without using any emulsifying agent or by using a very small amount of an emulsifying agent. This makes it possible to avoid the problem of the impairment of water resistance and the like due to the use of an emulsifying agent.

To this end, the unsaturated amido- and phenyl-substituted alkanesulfonic acid derivative is used in an amount of 0.05 to 40% by weight, preferably 0.1 to 20% by weight, based on the weight of the monomer having a radical polymerizable unsaturated bond. In the preparation of a polymer emulsion according to this method, common anionic surface active agents such as alkyl sulfates, alkylarylsulfonic acid salts, fatty acid soaps and the like can also be used. However, it is not desirable to use them in an amount of 1% by weight or more.

As the monomer having a radical polymerizable unsaturated bond, there may used all of the monomers enumerated in connection with the preparation of polymer-coated solid materials. The preparation of the polymer emulsion, in turn, may be carried out in the usual manner. That is, the emulsion can be prepared according to various procedures, for example, by adding the polymerization initiator and the monomer at the same time or by adding the monomer in steps. On this occasion, the unsaturated amido- and phenyl-substituted alkanesulfonic acid derivative may be present in the whole amount at the beginning of the polymerization or may be added little by little. Moreover, by varying its amount, the particle diameter of the emulsion can be controlled without using any surface active agent. As its amount is increased, the particle diameter generally becomes smaller.

A third useful material obtained by copolymerizing an unsaturated amido- and phenyl-substituted alkanesulfonic acid derivative with another copolymerizable monomer is a pigment dispersant which is obtained by copolymerizing such an unsaturated amido- and phenyl-substituted alkanesulfonic acid derivative with an $\alpha,\beta$-monoethylenically unsaturated carboxylic acid or its salt.

Conventionally, inorganic pigments such as clay, calcium carbonate, titanium oxide, zinc white, barium sulfate, talc, etc. and various organic pigments are used as pigments for water paints, pigments for paper coating, and the like. Generally, these pigments are formed into aqueous dispersions with the aid of various dispersants. Then, desired compositions are prepared by adding thereto pigment binders such as synthetic resin emulsions, synthetic rubber latices, PVA, casein and the like.

Recently, in the fields where these pigment dispersions are used, combinations of various pigments and pigment dispersions having high concentrations and good flow properties are desired in order to achieve good film performance at low cost. Conventionally, sodium pyriphosphate, sodium polyacrylate and the like are known as pigment dispersants, but none of them can fulfil the above-described requirements satisfactorily.

An alkali metal or ammonium salt of the copolymer prepared from an unsaturated amido- and phenyl-substituted alkanesulfonic acid derivative (in particular, APPS or its salt) and at least one $\alpha,\beta$-monoethylenically unsaturated carboxylic acid or its salt is a pigment dispersant which exerts an excellent dispersing effect even when used in small amounts and gives a pigment dispersion exhibiting low viscosity at high concentrations and having high viscosity stability with time and good flow properties.

The $\alpha,\beta$-monoethylenically unsaturated carboxylic acids which can be used in the preparation of the pigment dispersant of the present invention include acrylic acid, methacrylic acid, itaconic acid, maleic acid, fumaric acid, crotonic acid, and alkali metal or ammonium salts of the foregoing.

The quantitative relationship between these two monomers is such that the unsaturated amido- and phenyl-substituted alkanesulfonic acid derivative (for example, APPS) is copolymerized with the $\alpha,\beta$-monoethylenically unsaturated carboxylic acid in a proportion of 1/100 to 90/100 on a molar basis. If the proportion of APPS is less than 1/100, no satisfactory dispersing effect on the pigment cannot be produced, while if the proportion of APPS is greater than 90/100, the dispersing effect is undesirably impaired to the contrary. Moreover, any of the hydrophobic monomers enumerated in connection with the preparation of polymer-coated solid materials may be used together with the aforesaid monomers.

The pigment dispersant of the present invention can preferably be prepared, for example, by copolymerizing an alkali metal or alkaline earth metal salt of an unsaturated amido- and phenyl-substituted alkanesulfonic acid with an $\alpha,\beta$-monoethylenically unsaturated carboxylic acid (such as acrylic acid or the like) in an aqueous medium and then neutralizing the reaction mixture with an alkali metal hydroxide or carbonate, ammonia or the like, or by copolymerizing the aforesaid alkali metal or alkaline earth metal salt with an alkali metal salt or the like of an $\alpha,\beta$-monoethylenically unsaturated carboxylic acid in an aqueous medium. The polymerization initiator used for this reaction can be any of the compounds enumerated in connection with the preparation of polymer-coated solid materials.

Water is usually used as the aqueous medium for the polymerization. By way of example, deionized water, distilled water or the like is used. Moreover, water-miscible solvents such as alcohols, ketones and the like may be used in combination with water. Specific examples of the alcohols include methyl alcohol, ethyl alcohol, propyl alcohol, isopropyl alcohol, n-butyl alcohol, sec-butyl alcohol and the like, and specific examples of the ketones include acetone, methyl ethyl ketone and the like. The amount of organic solvent added to water may be in a range that does not cause the formed polymer to precipitate. Usually, the content of the organic solvent in the mixture is not greater than 90% by volume and preferably not greater than 80% by volume.

No particular limitation is placed on the concentration of the monomers. However, if the concentration is too high, the solution becomes excessively viscous and requires large amounts of energy for agitation, transfer and the like. If the concentration is too low, the polymerization rate becomes so low that much time is spent. Usually, the concentration is suitably 0.5 to 80% by weight and preferably 1 to 70% by weight.

In carrying out the polymerization, the polymerization vessel, polymerization solvent, polymerization initiator solution, monomers and the like should preferably be deoxygenated by purging with an inert gas such as nitrogen gas, so that the polymerization reaction may proceed rapidly. For the sake of simplicity, the polymerization may often be carried out under an oxygen-containing gas such as air. In such cases, the amount of the polymerization initiator (or the reducing agent when a redox polymerization initiator is used) should be increased.

The present invention is more specifically illustrated with reference to the following examples.

Preparation of Amidoalkanesulfonic Acid Derivatives

EXAMPLE 1

Into a 1-liter round bottom flask were charged 172 g of 2-phenyl-2-hydroxypropanesulfonic acid sodium salt and 382 g of acrylonitrile. While the contents were being stirred, 210 g of 5% fuming sulfuric acid was slowly added thereto, during which time the reaction temperature was kept at $-20°$ C. After completion of the addition, the reaction temperature was gradually raised until it reached 30° C. in 3 hours. Thereafter, the reaction was carried out at 30° C. for an additional 2 hours.

At that time, the presence of a white precipitate could already be recognized.

After the reaction was carried out for the predetermined period of time, 200 ml of acrylonitrile was added and the resulting precipitate was separated by filtration. The precipitate was dissolved in water, and this solution was neutralized with a suspension of calcium hydroxide until its pH reached 5. After the solution was filtered to remove any insoluble matter, the filtrate was evaporated to dryness. Thus, there was obtained 186 g (91% yield) of 2-acrylamido-2-phenylpropanesulfonic acid sodium salt (hereinafter abbreviated as APPS-Na).

COMPARATIVE EXAMPLE 1

Into a 1-liter round bottom flask was charged 344 g of acrylonitrile. While the contents were kept at −20° C., 160 g of 20% fuming sulfuric acid was slowly added thereto. Thereafter, while the contents were kept at −20° C. in the same manner, 187 g of α-methylstyrene was added thereto.

After completion of the addition, the reaction temperature was gradually raised until it reached 40° C. in 4 hours. Thereafter, the reaction was carried out at 40° C. for an additional 2 hours.

The reaction mixture was clear and no precipitate was observed. The addition of water to the reaction mixture caused no change. In contrast to Example 1, it was impossible to separate APPS. On analysis of the reaction mixture, it was confirmed that APPS had been formed in a very small amount.

EXAMPLE 2

Reaction was carried out in the same manner as in Example 1, except that 170 g of 2-phenyl-2-hydroxypropanesulfonic acid calcium salt was used in place of the 2-phenyl-2-hydroxypropanesulfonic acid sodium salt. After the reaction was carried out for the predetermined period of time, 200 ml of acrylonitrile was added and the resulting precipitate was separated by filtration. The precipitate was dissolved in water, and this solution was neutralized with a 40% aqueous solution of sodium hydroxide until its pH reached 5. After the solution was filtered to remove any insoluble matter, the filtrate was evaporated to dryness. Thus, there was obtained 190 g (93% yield) of APPS-Na.

EXAMPLE 3

Reaction and after-treatment were carried out in the same manner as in Example 1, except that 123 g of 2-methyl-2-hydroxypropanesulfonic acid sodium salt was used in place of the 2-phenyl-2-hydroxypropanesulfonic acid sodium salt.

Thus, there was obtained 160 g (87% yield) of 2-acrylamido-2-methylpropanesulfonic acid sodium salt.

EXAMPLE 4

Reaction and after-treatment were carried out in the same manner as in Example 1, except that 157 g of 2-phenyl-2-hydroxyethanesulfonic acid sodium salt and 210 g of 10% fuming sulfuric acid were used in place of the 2-phenyl-2-hydroxypropanesulfonic acid sodium salt and the 5% fuming sulfuric acid. As a result, there was obtained 165 g (85% yield) of 2-acrylamido-2-phenyl-ethanesulfonic acid sodium salt.

EXAMPLE 5

Reaction and after-treatment were carried out in the same manner as in Example 1, except that 114 g of 2-hydroxypropanesulfonic acid sodium salt and 210 g of 10% fuming sulfuric acid were used in place of the 2-phenyl-2-hydroxypropanesulfonic acid sodium salt and the 5% fuming sulfuric acid. As a result, there was obtained 123 g (82% yield) of 2-acrylamidopropanesulfonic acid sodium salt.

EXAMPLE 6

Reaction and after-treatment were carried out in the same manner as in Example 1, except that 500 g of benzonitrile was used in place of the acrylonitrile. As a result, there was obtained 175 g (87% yield) of 2-benzamido-2-phenylpropanesulfonic acid sodium salt.

EXAMPLE 7

Reaction and after-treatment were carried out in the same manner as in Example 1, except that 520 g of phenylacetonitrile was used in place of the acrylonitrile. As a result, there was obtained 174 g (83% yield) of 2-phenylacetamido-2-phenylpropanesulfonic acid sodium salt.

EXAMPLE 8

Reaction and after-treatment were carried out in the same manner as in Example 1, except that 330 g of benzonitrile was used in place of the acrylonitrile. As a result, there was obtained 132 g (80% yield) of 2-acetamido-2-phenylpropanesulfonic acid sodium salt.

EXAMPLE 9

Reaction and after-treatment were carried out in the same manner as in Example 1, except that 410 g of methacrylonitrile was used in place of the acrylonitrile. As a result, there was obtained 185 g (86% yield) of 2-methacrylamido-2-phenylpropanesulfonic acid sodium salt.

EXAMPLE 10

Reaction was carried out in the same manner as in Example 1. Acrylonitrile was added to the reaction mixture and the resulting precipitate was separated by filtration. The precipitate was added to 300 ml of methanol and stirred well. This mixture was neutralized by the addition of an 8% solution of sodium hydroxide in methanol. During the neutralization, samples were taken at regular intervals, diluted twofold with water and subjected to pH measurement. The end point was set to be when the pH reached 5 or higher. After completion of the neutralization, the mixture was filtered to remove any insoluble matter. Then, methanol was distilled off from the filtrate to obtain 182 g (89% yield) of APPS-Na. When the content of $SO_4^{2-}$ ion in the product was determined according to the barium sulfate method, it was found to be 0.6% as expressed in terms of sodium sulfate. On the other hand, its content in the product obtained in Example 1 was 2.8%.

COPOLYMER-COATED SOLID MATERIALS

EXAMPLE 11

To 600 g of deionized water were added 150 g of ground calcium carbonate, 30 g of styrene and 5.0 g of APPS-Na. After this mixture was stirred well under a stream of nitrogen gas, 0.6 g of potassium persulfate was added thereto and the resulting reaction mixture was polymerized at 65° C. for 5 hours. The polymerization proceeded with the solid material kept in a uniformly dispersed state. After the polymerization was carried out for a predetermined period of time, the reaction mixture was filtered. The filtration was achieved very rapidly and the resulting filtrate was colorless and clear. The insoluble fraction apparently comprised a homogeneous powder in which no polymer was precipitated in the form of strands or leaves. After drying in a vacuum, the resulting solid material was weighed to reveal that its yield was 171.9 g. When its surfaces were observed under a scanning electron microscope and compared with the surfaces of calcium carbonate observed in the same manner, it was confirmed that the surfaces of the above solid material were coated with polystyrene. Furthermore, by calculating the amount of polystyrene coating from the results of elemental analysis, the yield of the polymer was found to be 73%. On the other hand, when water was distilled off from the filtrate, 5.9 g of monomer residue was obtained.

EXAMPLES 12 TO 27

Copolymer-coated solid materials were prepared in the same manner as in Example 11, except that the combinations of solid material, monomer and sulfonic group-containing monomer shown in Table 1 were used in the respective amounts also shown therein.

The products were analyzed in the same manner as in Example 11 and the results thus obtained are shown in Table 2.

In this table, the results of evaluation of filterability are based on the following criteria.

○ : Filtration can be effected rapidly, and the resulting filtrate is colorless and clear.

Δ: Filtration can be effected by allowing sufficient time, but the filtration rate is low. The resulting filtrate is white and turbid.

X: Filtration is impossible and, therefore, no analysis of the solid material or the like can be made.

COMPARATIVE EXAMPLES 2 AND 3

Polymer-coated solid materials were prepared in the same manner as in Example 1, except that ground calcium carbonate or urea resin filler was used as the solid material, styrene or methyl methacrylate as the copolymerizable monomer, and conventionally known 2-acrylamido-2-methylpropanesulfonic acid sodium salt (hereinafter abbreviated as AMPS-Na) as the sulfonic group-containing monomer. They were used in the respective amounts shown in Table 1. The results thus obtained are shown Table 2.

TABLE 1

| | Solid material | | Monomer | | Sulfonic group-containing monomer | |
|---|---|---|---|---|---|---|
| | Type | Amount added (g) | Type | Amount added (g) | Type | Amount added (g) |
| Example 12 | Ground calcium carbonate | 150 | Acrylonitrile | 30 | APPS—Na | 5.0 |
| Example 13 | Ground calcium carbonate | " | Ethyl acrylate | 30 | " | 5.0 |
| Example 14 | Ground calcium carbonate | " | N—acryloyl-pyrrolidine | 30 | " | 5.0 |
| Example 15 | Ground calcium carbonate | " | Methyl methacrylate | 30 | " | 5.0 |
| Example 16 | Perlite | " | Styrene | 10 | " | 1.7 |
| Example 17 | Talc | " | Acrylonitrile | 5 | " | 0.8 |
| Example 18 | Carbon black | " | Methyl methacrylate | 20 | " | 3.3 |
| Example 19 | Urea resin filler | " | Methyl methacrylate | 15 | " | 2.5 |
| Example 20 | Urea resin filler | " | Styrene | 15 | " | 2.5 |
| Example 21 | Polyvinyl chloride powder | " | " | 75 | " | 12.5 |
| Example 22 | Ferrocyan blue | " | Methyl methacrylate | 10 | " | 1.7 |
| Example 23 | Shirasu balloon | 75 | Styrene | 15 | " | 2.5 |
| Example 24 | Precipitated calcium carbonate | 150 | " | 100 | " | 16.7 |
| Example 25 | Carbon black | " | " | 5 | " | 0.8 |
| Example 26 | Magnetite | " | " | 15 | " | 2.5 |
| Example 27 | Mica | " | Methyl methacrylate | 15 | " | 2.5 |
| Comparative Example 2 | Ground calcium carbonate | " | Styrene | 30 | AMPS—Na | 5.0 |
| Comparative Example 3 | Urea resin filler | " | Methyl methacrylate | 30 | " | 5.0 |

TABLE 2

| | Filter-ability | Yield of polymer-coated solid material (g) | Yield of polymer (g) | Residue in filtrate (g) |
|---|---|---|---|---|
| Example 12 | O | 174.3 | 81 | 5.7 |
| Example 13 | O | 173.4 | 78 | 5.9 |
| Example 14 | O | 178.5 | 95 | 5.8 |
| Example 15 | O | 177.3 | 91 | 5.7 |
| Example 16 | O | 158.7 | 87 | 2.4 |
| Example 17 | O | 154.4 | 88 | 1.5 |
| Example 18 | O | 162.0 | 60 | 4.2 |
| Example 19 | O | 164.0 | 93 | 3.4 |
| Example 20 | O | 160.5 | 70 | 3.3 |
| Example 21 | Δ | 204.8 | 73 | 16.3 |
| Example 22 | O | 157.5 | 75 | 2.4 |
| Example 23 | Δ | 84.0 | 60 | 3.5 |
| Example 24 | O | 200.0 | 50 | 18.4 |
| Example 25 | Δ | 152.1 | 42 | 1.8 |
| Example 26 | O | 161.4 | 76 | 3.3 |
| Example 27 | O | 162.0 | 80 | 3.0 |
| Comparative Example 2 | Δ | 151.8 | 6 | 9.1 |

EXAMPLE 28

To 600 g of deionized water were added 150 g of ground calcium carbonate, 15 g of N-n-butylacrylamide and 2.5 g of APPS-Na. After this mixture was stirred well, 0.5 g of ammonium persulfate and 0.4 g of sodium hydrogensulfite were added thereto and the resulting reaction mixture was polymerized at 40° C. for 5 hours. The polymerization proceeded with the solid material kept in a uniformly dispersed state. After-treatment of the reaction mixture and subsequent analysis of the product were carried out in the same manner as in Example 11. The results thus obtained are shown in Table 4.

EXAMPLES 29 to 40

Copolymer-coated solid materials were prepared in all the same manner as in Example 28, except that the combinations of solid material, monomer and sulfonic group-containing monomer shown in Table 3 were used in the respective amounts also shown therein. After-treatment of the reaction mixture and subsequent analysis of the product were carried out in the same manner as in Example 11. The results thus obtained are shown in Table 4.

TABLE 3

| | Solid material | | Monomer | | Sulfonic group-containing monomer | |
|---|---|---|---|---|---|---|
| | Type | Amount added (g) | Type | Amount added (g) | Type | Amount added (g) |
| Example 28 | Ground calcium carbonate | 150 | N—n-butyl-acrylamide | 15 | APPS—Na | 2.5 |
| Example 29 | Ground calcium carbonate | " | Ethyl acetate | 15 | " | 2.5 |
| Example 30 | Ground calcium carbonate | " | Styrene, butadiene | 15, 15 | " | 5.0 |
| Example 31 | Alumina | " | Styrene | 5 | " | 0.8 |
| Example 32 | Particle board | 75 | Methyl methacrylate | 30 | " | 5.0 |
| Example 33 | Brass powder | 150 | Styrene | 5 | " | 0.8 |
| Example 34 | White carbon | 75 | Methyl methacrylate | 15 | " | 2.5 |
| Example 35 | Asbestos | 40 | Styrene | 5 | " | 0.8 |
| Example 36 | Magnetite | 150 | Methyl methacrylate | 15 | " | 2.5 |
| Example 37 | Mica | " | Styrene | 15 | " | 2.5 |
| Example 38 | Lake Red 4R | " | Methyl methacrylate | 10 | " | 1.7 |
| Example 39 | Calcium sulfite | " | Styrene | 30 | " | 5.0 |
| Example 40 | Copper powder | " | Styrene | 5 | " | 0.8 |

TABLE 2-continued

| | Filter-ability | Yield of polymer-coated solid material (g) | Yield of polymer (g) | Residue in filtrate (g) |
|---|---|---|---|---|
| Comparative Example 3 | X | — | — | — |

TABLE 4

| | Filter-ability | Yield of polymer-coated solid material (g) | Yield of polymer (g) | Residue in filtrate (g) |
|---|---|---|---|---|
| Example 28 | O | 164.4 | 96 | 3.6 |
| Example 29 | O | 151.7 | 11 | 3.9 |
| Example 30 | O | 173.4 | 78 | 6.5 |
| Example 31 | O | 154.0 | 80 | 1.9 |
| Example 32 | O | 96.3 | 71 | 7.1 |
| Example 33 | O | 153.5 | 69 | 2.0 |
| Example 34 | O | 87.0 | 80 | 3.7 |
| Example 35 | O | 44.1 | 82 | 2.1 |
| Example 36 | O | 164.0 | 93 | 3.6 |
| Example 37 | O | 162.2 | 81 | 3.7 |
| Example 38 | O | 158.4 | 84 | 3.4 |
| Example 39 | O | 174.3 | 81 | 6.3 |
| Example 40 | O | 154.0 | 80 | 2.0 |

EXAMPLE 41

To 600 g of deionized water were added 150 g of ground calcium carbonate, 15 g of styrene and 2.5 g of APPS-Na. After this mixture was stirred well, 0.5 g of ammonium persulfate and 0.4 g of sodium hydrogensulfite were added thereto and the resulting reaction mixture was polymerized at 40° C. for 5 hours. After the polymerization was carried out for a predetermined period of time, the reaction mixture was filtered. To the filtrate were added 150 g of ground calcium carbonate and 15 g of styrene. After this mixture was stirred well, 0.5 g of ammonium persulfate and 0.4 g of sodium hydrogensulfite were added thereto and the resulting reaction mixture was polymerized again at 40° C. for 5 hours. After-treatment of the reaction mixture and subsequent analysis of the product were carried out in the same manner as in Example 1. In the first polymerization step, the yield of the polymer-coated solid material was 161.7 g and the yield of the polymer was 78%. In the second polymerization step, they were 161.3 g and 78%, respectively.

EXAMPLE 42

To 600 ml of a mixed solvent consisting of methanol and water (in a volume ratio of 50:50) were added 150 g of ground calcium carbonate, 30 g of styrene and 5.0 g of APPS-Na. After this mixture was stirred well, 0.6 g of 4,4'-azobis-4-cyanovaleric acid was added thereto and the resulting reaction mixture was polymerized at 50° C. for 5 hours. After-treatment of the reaction mixture and subsequent analysis of the product were carried out in the same manner as in Example 11. The results thus obtained are shown in Table 6.

EXAMPLES 43 to 45

Using the compositions shown in Table 5, polymerization was carried out at 50° C. for 5 hours. After-treatment of the reaction mixture and subsequent analysis of the product were carried out in the same manner as in Example 11. The results thus obtained are shown in Table 6.

EXAMPLE 46

Fifty grams of the polymethyl methacrylate copolymer-coated ground calcium carbonate powder prepared in Example 15 was placed in a compression type mold and molded at a pressure of 200 kg/cm$^2$ and a mold temperature of 180° C. This molded piece had a bending strength of 321 kg/cm$^2$.

(B) Stability to calcium chloride

To 10 ml of the emulsion was added a 10% aqueous solution of calcium chloride in small increments. The stability to calcium chloride was expressed as the minimum volume (ml) of the aqueous calcium chloride solution required to cause coagulation and separation of the disperse phase of the emulsion.

(C) Viscosity

The viscosity of the emulsion was measured at 25° C. by means of a Brookfield viscometer.

(D) Water resistance of coating film

Using an applicator, zinc phosphate-treated valve steel was coated with the emulsion to a thickness of 30μ and dried at room temperature for a week. After being dried, the specimen was immersed in city water for a month. Then, the specimen was examined for blistering of the coating film, the formation of rust, and the like and evaluated by comparison with a control. The results are expressed as follows: , good; Δ, moderate; X, poor.

The results thus obtained are show in Table 7.

COMPARATIVE EXAMPLE5

A polymer emulsion was prepared in the same manner as in Example 47, except that 6 g of AMPS-Na was used in place of the APPS-Na (6 g). The resulting polymer emulsion was evaluated in the same manner as in Example 47 and the results thus obtained are shown in Table 7.

EXAMPLES 48 to 51

Polymer emulsions were prepared in the same manner as in Example 47, except that the starting materials shown in Table 7 were used in the respective amounts also shown therein. The resulting polymer emulsions were evaluated in the same manner as in Example 47 and the results thus obtained are also shown in Table 7.

EXAMPLE 7

TABLE 5

| | Solid material | | Monomer | | Sulfonic group-containing monomer | | |
|---|---|---|---|---|---|---|---|
| | Type | Amount added (g) | Type | Amount added (g) | Type | Amount added (g) | Solvent (volume ratio) |
| Example 43 | Ground calcium carbonate | 150 | Methyl methacrylate | 30 | APPS—Na | 5.0 | Methanol/water (50/50) |
| Example 44 | Ground calcium carbonate | " | Styrene | 30 | " | 5.0 | Methanol |
| Example 45 | Ground calcium carbonate | " | Methyl methacrylate | 30 | " | 5.0 | Methanol |

TABLE 6

| | Filterability | Yield of polymer-coated solid material (g) | Yield of polymer (%) | Residue in filtrate (g) |
|---|---|---|---|---|
| Example 42 | O | 165.3 | 51 | 6.0 |
| Example 43 | O | 171.9 | 73 | 6.1 |
| Example 44 | O | 153.3 | 11 | 5.8 |
| Example 45 | O | 155.4 | 18 | 5.7 |

COPOLYMER EMULSIONS

EXAMPLE 47

[Preparation of polymer emulsion]

Into a 2-liter reaction flask previously purged with nitrogen gas were charged 700 g of deionized water and 6 g of APPS-Na. This mixture was heated to 65° C. with stirring. Then, 2 g of potassium persulfate was added thereto. After 5 minutes, 300 g of styrene was added dropwise over a 1-hour period. Thereafter, the reaction mixture was polymerized for 2 hours to obtain a polymer emulsion.

[Evaluation of polymer emulsion]

(A) Average particle diameter

The average particle diameter was measured by centrifugal turbidimetry.

| | Example | | | | | Comparative Example |
|---|---|---|---|---|---|---|
| | 47 | 48 | 49 | 50 | 51 | 4 |
| Monomer (g) | Styrene, 300 | Styrene, 300 | Styrene, 180 Butadiene, 120 | EA*, 150 BA**, 150 | EA, 150 BA, 150 | Styrene, 300 |
| APPS—Na (g) | 6 | 10 | 6 | 6 | 6 | 6 (AMPS—Na) |
| Sodium lauryl sulfate (g) | 0 | 0 | 0 | 0 | 0.5 | 0 |
| Potassium persulfate (g) | 2 | 2 | 2 | 2 | 2 | 2 |
| Deionized | 700 | 700 | 700 | 700 | 700 | 700 |

-continued

| | Example | | | | | Comparative Example |
|---|---|---|---|---|---|---|
| | 47 | 48 | 49 | 50 | 51 | 4 |
| water (g) | | | | | | |
| Average particle diameter (mµ) | 164 | 116 | 173 | 140 | 132 | 250 |
| Stability to calcium chloride (ml) | 8.7 | 9.1 | 8.3 | 13.7 | 13.2 | 3.9 |
| Viscosity (cps) | 11 | 13 | 12 | 15 | 15 | 43 |
| Water resistance of coating film | O | O | O | O | O | X*** |

*EA: Ethyl acrylate.
**BA: Butyl acrylate.
***No stable emulsion could be formed.

PIGMENT DISPERSANTS

EXAMPLE 52

[Preparation of pigment dispersant]

To a mixed solvent consisting of 400 g of water and 160 g of isopropyl alcohol were added 140 g of acrylic acid and 120 g of APPS-Na. After purging with nitrogen gas, 2 g of potassium persulfate was added thereto and the resulting reaction mixture was heated to 80° C. in order to initiate the polymerization. After the polymerization was carried out at 80° C. for 3 hours with adequate stirring, the isopropyl alcohol was removed. Then, a pigment dispersant was obtained by adjusting the aqueous phase to pH 9.0 by the addition of 50% sodium hydroxide and diluting it with water so as to give a concentration of 20% by weight.

[Evaluation of dispersant]

Two grams of the above dispersant was added to 60 g of water and dissolved therein with adequate stirring. Then, 140 g of ground calcium carbonate was added thereto and this mixture was fully mixed to obtain a homogeneous dispersion. When the viscosity of this dispersion was measured at 25° C. immediately after mixing and after standing at room temperature for a day, it was found to be 85 and 87 cps, respectively.

COMPARATIVE EXAMPLE 4

A dispersant was prepared in the same manner as in Example 52, except that a mixture consisting of 60 g of acrylic acid and 220 g of 2-acrylamido-2-methylpropanesulfonic acid sodium salt was used.

Using the dispersant thus obtained, a pigment slurry was formed in the same manner as in Example 52. When its viscosity was measured to evaluate the dispersant, it was found to be 140 cps immediately after mixing and 155 cps after standing at room temperature for a day.

EXAMPLE 53

[Preparation of pigment dispersant]

To 600 g of water were added 45 g of APPS-Na and 105 g of sodium acrylate. After adequate stirring, 2 g of ammonium persulfate and 3 g of sodium hydrogensulfite were added and the resulting reaction mixture was heated to 50° C. in order to initiate the polymerization. After the polymerization was carried out at 50° C. for 6 hours with adequate stirring, the resulting viscous reaction mixture was used as a pigment dispersant.

[Preparation and evaluation of pigment dispersion]

One and a half grams of the dispersant prepared as above was added to 36.5 g of water and this mixture was stirred well to form a homogeneous aqueous solution. Then, 20 g of ground calcium carbonate and 80 g of clay (Ultrawhite UW-90; Endelhardt Co.) were added thereto and this mixture was fully mixed. To this clay-containing blend were added 25 g of a 20% aqueous solution of starch and then 20 g of a 50% SBR latex. The resulting mixture was fully mixed to obtain a pigment dispersion. The stability of this dispersion was evaluated by measuring its viscosity immediately after mixing and after standing at room temperature for a day. The results thus obtained are shown in Table 8.

[Coating of pigment dispersion and evaluation of coated paper]

Using a coating rod, the surfaces of wood free paper were manually coated with the pigment dispersion prepared as above. After being dried at room temperature, the paper was supercalendered to obtain coated paper. The coating weight was calculated from the increase in weight of the coated paper.

The coated paper thus obtained was evaluated by the following blank paper tests and printing tests.

Blank paper tests (1) Gloss

The gloss was measured at an angle of 75° by means of a gloss meter (Murakami Shikisai Co.).

(2) Whiteness and opacity

The whiteness and opacity were measured by means of a Hunter colorimeter. Greater values indicate better results.

Printing tests (1) Dry pick and wet pick

The dry pick and wet pick were evaluated by means of an RI tester (Akari Seisakusho). The evaluation was made on a 10-point basis and greater values indicate better results.

(2) Gloss

The gloss of the coated paper printed as above was measured in the same manner as in the blank paper tests.

The results thus obtained are shown in Table 8.

EXAMPLES 54 and 55

Pigment dispersants were prepared in the same manner as in Example 53, except that 70 g of APPS-Na and 80 g of sodium methacrylate were used in Example 54 and 50 g of APPS-Na, 80 g of sodium methacrylate and 20 g of sodium itaconate were used in Example 55.

Using each of these pigment dispersants, a pigment dispersion was prepared and used to make coated paper. The results of its evaluation are shown in Table 8.

TABLE 8

|  | Stability of dispersion | | Coating weight (g/m²) | Blank paper test | | | Printing test | | |
|---|---|---|---|---|---|---|---|---|---|
|  | Viscosity immediately after milling (cps) | Viscosity after standing for a day (cps) |  | Gloss (%) | Whiteness (%) | Opacity (%) | Dry pick | Wet pick | Gloss (%) |
| Example 53 | 1320 | 1360 | 21.2 | 75.6 | 85.3 | 91.2 | 8.0 | 6.5 | 91.0 |
| Example 54 | 1540 | 1610 | 21.4 | 78.9 | 85.6 | 91.5 | 8.5 | 6.8 | 92.3 |
| Example 55 | 1470 | 1550 | 21.0 | 76.5 | 85.2 | 91.7 | 8.2 | 7.1 | 91.4 |

We claim:

1. A process for preparing amido- and phenyl-substituted alkanesulfonic acids which comprises reacting a nitrile compound of the formula

where $R_1$ is an alkenyl group having 1 to 12 carbon atoms, with an alkali metal salt of a β hydroxyalkanesulfonic acid of the general formula

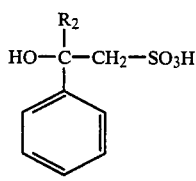

wherein $R_2$ is hydrogen, an alkyl group having 1 to 4 carbon atoms or a phenyl group in concentrated sulfuric acid having a concentration of not less than 90 percent by weight to form a derivative of an amidoalkanesulfonic acid of the general formula

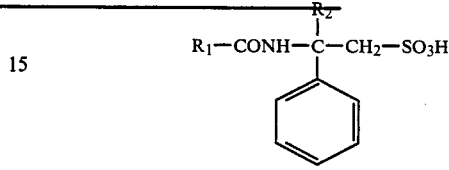

where $R_1$ and $R_2$ are as defined above; and, after the completion of the reaction, allowing the sulfate of amidoalkanesulfonic acid salt to deposit for separation and recovery as solid materials.

2. A process as claimed in claim 1, wherein a sulfate of an alkaline earth metal formed by neutralizing the sulfate of the separated amidoalkanesulfonic acid salt with an alkali metal salt or alkaline earth metal salts as desired in water or a polar organic solvent is separated so that the desired derivative of amidoalkanesulfonic acid is recovered in the aqueous solution phase.

3. A process as claimed in claim 1 wherein the derivative is a 2-acrylamido-2-phenylpropanesulfonic acid derivative thereof.

4. A process as claimed in claim 1 wherein the nitrile compound is used in an amount of 2 to 30 moles per mole of the β-hydroxyalkanesulfonic acid.

5. A process as claimed in claim 1 wherein the reaction is carried out at a temperature ranging from −25° to 100° C.

6. A process as claimed in claim 1 wherein the concentrated sulfuric acid varies from having a concentration of not less than 90% by weight to fuming sulfuric acid having a concentration of 30% by weight.

7. A process as claimed in claim 1 wherein the resulting sulfate of the amidoalkanesulfonic acid salt is neutralized in a polar organic solvent to precipitate the inorganic sulfate as crystals and the desired amidoalkanesulfonic acid salt is separated from the liquid phase.

* * * * *